No. 876,833. PATENTED JAN. 14, 1908.
S. PERCIVAL.
POULTRY ROOST.
APPLICATION FILED DEC. 22, 1906.
2 SHEETS—SHEET 1.
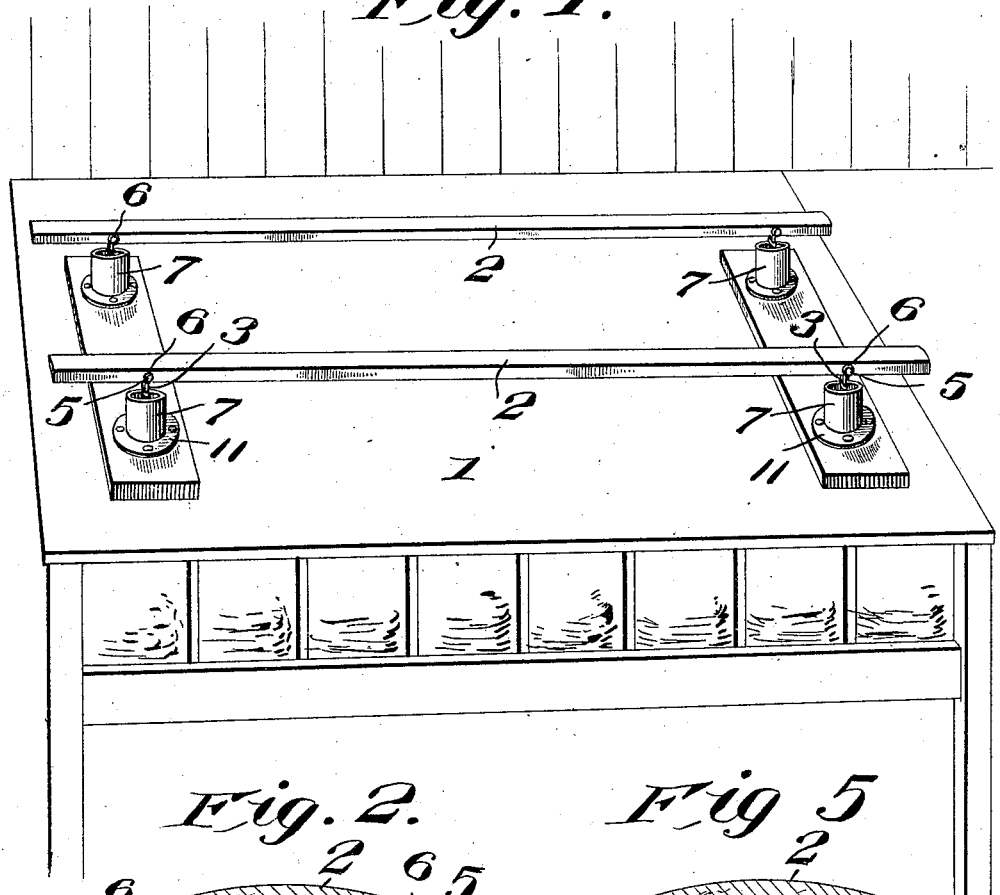
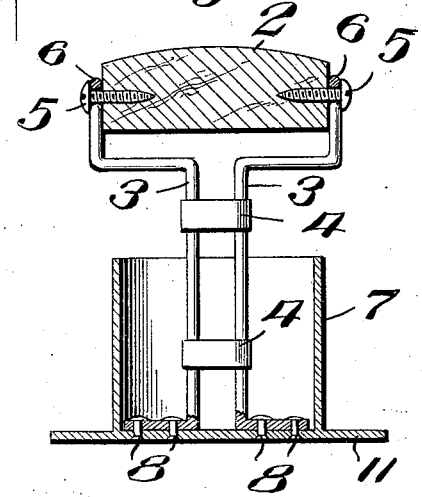
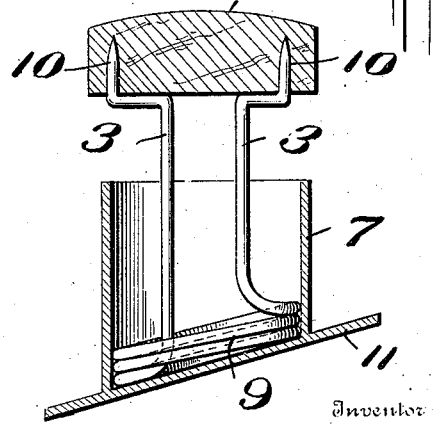
Inventor
Spencer Percival
Witnesses

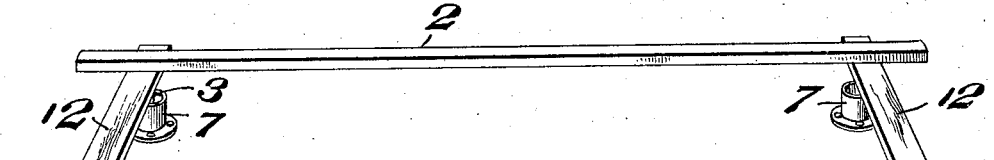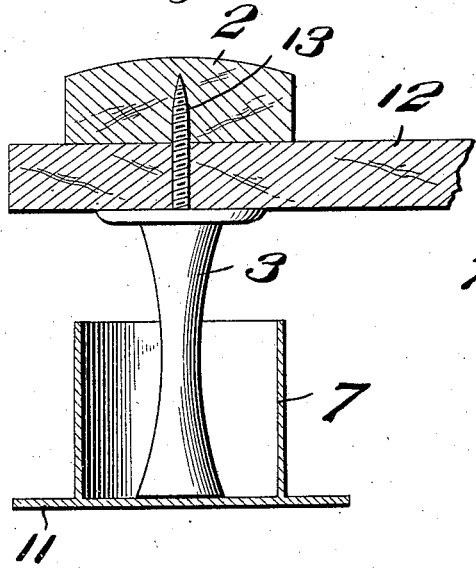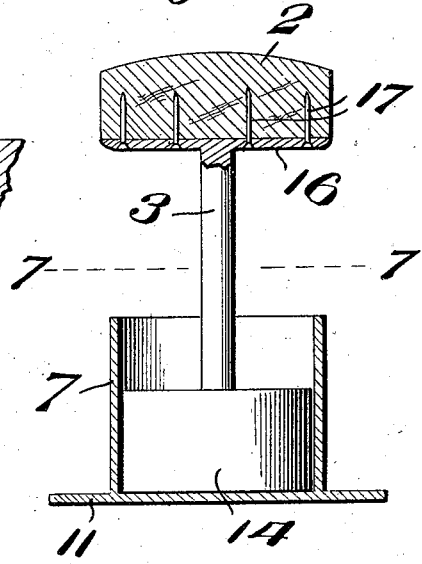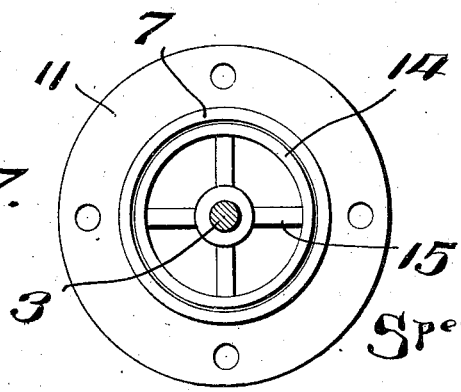

UNITED STATES PATENT OFFICE.

SPENCER PERCIVAL, OF NORTH PENDER ISLAND, BRITISH COLUMBIA, CANADA.

POULTRY-ROOST.

No. 876,833.      Specification of Letters Patent.      Patented Jan. 14, 1908.

Application filed December 22, 1906. Serial No. 349,099.

*To all whom it may concern:*

Be it known that I, SPENCER PERCIVAL, a citizen of the Dominion of Canada, residing at North Pender Island, in the Province of British Columbia, Canada, have invented certain new and useful Improvements in Poultry-Roosts; and I do hereby declare the following to be a full, clear, and exact description of the invention, such as will enable others skilled in the art to which it appertains to make and use the same.

My invention relates to new and useful improvements in poultry roosts and my object is to provide a support for the roosts which will protect the same from vermin and a further object is to so construct the supports that the roosts may be readily removed from the supports.

Other objects and advantages will be hereinafter referred to and more particularly pointed out in claims.

In the accompanying drawings which are made a part of this application, Figure 1 is a perspective view of my improved form of roosts and supports thereof. Fig. 2 is a sectional view through the roost and supporting mechanism. Fig. 3 is a perspective view of a roost having a slightly modified form of support. Fig. 4 is a detailed sectional view through that form of roost and support shown in Fig. 3. Fig. 5 is a sectional view of that form of roost shown in Fig. 1 with a slightly modified form of support. Fig. 6 is a sectional view of a slightly modified form of support from that shown in Fig. 5, and, Fig. 7 is a sectional view on line 7—7 of Fig. 6.

Referring to the drawings in which similar reference numerals designate corresponding parts throughout the several views, 1 indicates a floor upon which is disposed a plurality of my improved form of roosts 2, which are supported in position above the floor by means of standards 3, said standards preferably consisting of parallel wires, which are secured together by means of bands 4, the upper ends of said standards being separated and directed at each side of the roosts and secured thereto by means of screws or the like 5, which are disposed through eyes 6 at the upper ends of the standards 3, and into the roosts.

In order to protect the roosts from vermin, the lower ends of the standards are surrounded with a cup 7 and are secured therein in any preferred manner as by riveting the lower ends of the standards to the bottom of the cup as shown at 8 in Fig. 2. The cups 7 are adapted to receive and hold any suitable form of liquid and the diameter of the cup is such that when so filled with the liquid the vermin will be unable to gain access to the standards and thereby preventing the same from reaching the roosts.

Instead of securing the standards directly to the bottom of the cup, said standards may be made of one continuous piece of wire and coiled together as shown at 9, in Fig. 5 of the drawings, said coil being of sufficient dimension to snugly fit the interior of the cup and rest upon the floor thereof; the upper ends of said standards being provided with points 10 which are driven into the lower edge of the roosts instead of having the screws as shown in Fig. 2. In this instance the cup is also provided with a slanted bottom 11, so that when the same is applied to a slanted floor the roosts will be held in a horizontal plane, the coils at the lower ends of the standards 3 being likewise slanted to contact with the floor of the cup.

In Figs. 3 and 4 the supporting standard is made up of a single piece of material and of less diameter than the circumference of the cup, and in order to hold the roosts in their proper position and to prevent the same from tilting, a bar 12, is disposed below the roosts and directly on to the standards and said standards are secured to the bars and roosts by directing a screw 13, through the bars and into the roosts and it will be seen that when two or more of the roosts are secured to the bars that said roosts will be held rigidly in position and prevented from tilting.

In Figs. 6 and 7 I have also shown a standard as constructed from a single piece of material and in order to dispense with the bars 12, and at the same time support the roosts and prevent the same from tilting I have provided the lower end of the standard with a supporting ring 14, which is of sufficient diameter to snugly fit within the cup 7, and is connected to the standard by means of spokes 15, the upper end of the standard in this instance being provided with a plate 16, upon which rests the roosts 2, and are secured together in any preferred manner as by disposing nails 17, through openings in the plate and into the roost.

By securing the standards to the roosts with screws as shown in Figs. 1 and 2 of the drawings it will be readily seen that said roosts may be quickly removed from the standards by removing the screws from the eyes 6, while in the other forms of standards the roosts and supporting standards thereof may be bodily removed from the cups when desired. It will now be readily seen that I have provided a very cheap and economical form of roost and one that may be readily removed from position when desired and it will be also seen that I have provided an effective means for preventing vermin from gaining access to the roosts.

What I claim is:

1. A roost of the class described comprising a flanged cup, a standard having a flanged base supported on the bottom of said cup parallel therewith, and a roost secured to the upper end of said standard.

2. A roost comprising a cup having a slanting bottom, a coil fitting snugly within said cup with its lower face inclined to correspond to the slant of said bottom, standards extending upwardly from said coil and a roost supported on the upper ends of said standards.

In testimony whereof I have signed my name to this specification in the presence of two subscribing witnesses.

SPENCER PERCIVAL.

Witnesses:
JOHN WILLEY,
J. AUCHTERLONIE.